US009786934B2

(12) United States Patent
Gould et al.

(10) Patent No.: US 9,786,934 B2
(45) Date of Patent: Oct. 10, 2017

(54) PERFORMANCE RECOVERY OF A FUEL CELL

(75) Inventors: Benjamin D. Gould, Alexandria, VA (US); Karen Swider Lyons, Alexandria, VA (US); Olga A. Baturina, Burke, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 980 days.

(21) Appl. No.: 12/831,382

(22) Filed: Jul. 7, 2010

(65) Prior Publication Data
US 2011/0008686 A1 Jan. 13, 2011

Related U.S. Application Data

(60) Provisional application No. 61/223,767, filed on Jul. 8, 2009.

(51) Int. Cl.
*H01M 8/02* (2016.01)
*H01M 8/04537* (2016.01)
*H01M 8/04858* (2016.01)
*H01M 8/04223* (2016.01)
*H01M 8/1018* (2016.01)

(52) U.S. Cl.
CPC ... *H01M 8/04544* (2013.01); *H01M 8/04865* (2013.01); *H01M 8/04895* (2013.01); *H01M 8/04925* (2013.01); *H01M 8/04223* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 6,399,231 B1 * | 6/2002 | Donahue et al. | 429/431 |
| 6,472,090 B1 | 10/2002 | Colbow et al. | |
| 6,656,870 B2 * | 12/2003 | Christian et al. | 502/180 |
| 6,841,278 B2 | 1/2005 | Reiser et al. | |
| 7,038,424 B2 | 5/2006 | Adams et al. | |
| 2006/0249399 A1 | 11/2006 | Uribe et al. | |

OTHER PUBLICATIONS

Baturina et al., "Effect of SO2 on the Performance of the Cathode of a PEM Fuel Cell at 0.5-0.7 V" J. Electrochemical Soc., 156, B1423 (2009).
Bender et al., "Method using gas chromatography to determine the molar flow balance for proton exchange membrane fuel cells exposed to impurities" Journal of Power Sources 193 (2009) 713-722.

(Continued)

*Primary Examiner* — Lisa S Park
(74) *Attorney, Agent, or Firm* — US Naval Research Laboratory; Joseph T. Grunkemeyer

(57) ABSTRACT

A method of improving the electrical performance of an operating fuel cell catalyst-containing cathode in a fuel cell connected to an electrical load by: reducing the flow of air to the cathode; disconnecting the load from the fuel cell; connecting a potentiostat to the fuel cell; cycling an applied voltage, current, or power to the fuel cell one or more times; disconnecting the potentiostat from the fuel cell; reconnecting the load to the fuel cell; and resuming the flow of air to the cathode.

12 Claims, 11 Drawing Sheets

(56) References Cited

OTHER PUBLICATIONS

Contractor et al., "The Nature of Species Adsorbed on Platinum from SO2 Solutions" J. Electroanalytical Chem., 93, 99 (1978).
Garsany et al., "Impact of Sulfur Dioxide on the Oxygen Reduction Reaction at Pt/Vulcan Carbon Electrocatalysts" J. Electrochemical Soc., 154, B670 (2007).
Gould et al., "Deactivation of Pt/VC proton exchange membrane fuel cell cathodes by SO2, H2S and COS" J. Power Sources 188 (2009) 89-95.
Loucka, "Adsorption and Oxidation of Sulphur and of Sulphur Dioxide at the Platinum Electrode" J. Electroanalytical Chem., 31, 319 (1971).
Mohtadi et al., "Assessing durability of cathodes exposed to common air impurities" Journal of Power Sources, 138, 216 (2004).
Shi et al., "Hydrogen sulfide poisoning and recovery of PEMFC Pt-anodes" Journal of Power Sources, 165, 814 (2007).
Spotnitz et al., "The Activated Electro-Oxidation of Sulphur Dioxide on Smooth Platinum" Electrochimica Acta, 28, 1053 (1983).
Takeuchi et al., "Modeling and Investigation of Design Factors and Their Impact on Carbon Corrosion of PEMFC Electrodes" J. Electrochemical Soc., 155, B770 (2008).
Urdampilleta et al., "PEMFC Poisoning with H2S: Dependence on Operating Conditions" ECS Transactions, 11, 831 (2007).

\* cited by examiner

PERFORMANCE RECOVERY OF A FUEL CELL

This application claims the benefit of U.S. Provisional Application No. 61/223,767, filed on Jul. 8, 2009. The provisional application and all other publications and patent documents referred to throughout this nonprovisional application are incorporated herein by reference.

TECHNICAL FIELD

The present disclosure is generally related to methods for recovering the performance of a fuel cell.

DESCRIPTION OF RELATED ART

Proton exchange membrane fuel cells (PEMFCs) are energy conversion devices that convert fuel ($H_2$) and oxidizer ($O_2$ in air) to electricity via electrocatalysis on highly dispersed Pt nanoparticles or other catalyst. The cathode electrocatalyst of most PEMFCs is air breathing, making it vulnerable to airborne contaminants that can adsorb on the Pt nanoparticles and decrease catalytic activity. Airborne contaminants disrupt the oxygen reduction reaction (ORR) at the cathode by adversely modifying the surface of the electrocatalyst.

The sources of airborne pollution are numerous; they range from man-made sources, such as exhausts from power plants or gasoline and diesel combustion engines, to those of natural origin, such as the exhaust of active volcanoes. Of the possible airborne contaminants, gaseous sulfur species such as $SO_2$, $H_2S$, and COS are some of the most aggressive catalytic poisons (Mohtadi et al., Journal of Power Sources, 138, 216 (2004); Nagahara et al., Journal of Power Sources, 182, 422 (2008); Gould et al., Journal of Power Sources, 188, 89 (2009)). The deleterious interactions between sulfur compounds and Pt electrodes are the subject of numerous studies in the literature. Some studies have focused on recovery methods for air-contaminated PEMFCs (Mohtadi; Nagahara; Shi et al., Journal of Power Sources, 165, 814 (2007); Baturina et al., Journal of the Electrochemical Society, 156, B1423 (2009)), whereby electrochemical laboratory methods are used to regain PEMFC performance.

The types of compounds that are detrimental to fuel cell operation include but are not limited to: carbon monoxide, hydrocarbons, and molecules containing sulfur. Sulfur containing molecules, like $H_2S$, are particularly aggressive catalyst poisons that deactivate the fuel cell even at ppm levels (2). Deactivation is caused by the adsorption of the contaminant species onto the surface of the Pt catalysts. An example of this kind of adsorption reaction is shown below for sulfur adsorption onto Pt exposed to hydrogen sulfide (Mohtadi).

$$Pt+H_2S \rightarrow Pt-S+H_2 \quad (1)$$

The contaminant species not only block catalytic sites but they can also impart electronic effects that further diminish the catalytic properties of the remaining Pt surface sites. Regaining the original electrocatalyst activity requires desorbing the contaminant species, which usually requires changing the chemical environment of the catalyst.

An attribute of electrochemical systems is that elemental oxidation states can be changed as a function of cell potential. Above about 0.8 V, platinum in the presence of water is oxidized as oxygen (or OH—) adsorbs on its surface. The Pt is converted to an oxide at >1.0 V. The Pt oxide is inert to the ORR, but its activity can be regained by reducing it back to Pt metal at lower potentials (i.e., <0.4 V). Sulfur on Pt is also oxidized to sulfate above about 0.9 V via the oxidation reaction in Eq. 2. The sulfate, once formed, is innocuous to the Pt, and desorbs due to its water solubility.

$$Pt-S+H_2O \rightarrow SO_4^{2-}+8H^++6e^-+Pt \quad (2)$$

The formation of platinum surface oxides ($PtO_x$) occurs in parallel with the sulfur oxidation reaction and plays a role in the sulfur species desorption. The surface oxides may contribute some of the oxygen needed for sulfur oxidation, and may also help in the physical desorption the adsorbed sulfate species from the Pt surface (as the oxides form, they may push out the adsorbed sulfates). The Pt oxide formation is likely critical to the removal of other adsorbed species beyond S, such as organic compounds and chlorides.

Carbon is irreversibly oxidized to carbon dioxide at high potentials, particularly in the presence of oxygen: this reaction must be prevented in PEM fuel cells which typically use carbon as an electrocatalyst support.

The previous methods utilized for recovering deactivated fuel cell catalysts include: air purges, exposure of the cell to open circuit voltage (~0.9 V), proprietary shut down procedures, and cyclic voltammetry (Mohtadi et al., Journal of Power Sources, 138, 216 (2004); Takeuchi et al., Journal of the Electrochemical Society, 155, B770 (2008); Urdampilleta et al., ECS Transactions, 11, 831 (2007); Shi et al., Journal of Power Sources, 165, 814 (2007)). Recovery of deactivated fuel cells by purging them with air or by exposing the cell to open circuit voltage requires prolonged time periods for recovery, usually many hours (Urdampilleta). During these recovery periods power generation from the fuel cell is halted; making these methods unsuitable for recovery during the operation of a fuel cell powered system. Both recovery through shut down procedures and exposure of the cell to open circuit voltages can lead to cell degradation because the membrane electrode assembly (MEA) is exposed to voltages in air that are thermodynamically favorable for Pt and carbon oxidation (Pourbaix, Atlas of Electrochemical Equilibria in Aqueous Solutions, Pergamon, New York (1966)). Cyclic voltammetry is a good method for removing contaminants species from the Pt surface, however it requires the use of an inert gas. It is not practical to have a separate inert gas available for regeneration (Shi).

In the patent literature air starvation is claimed to be an operation recovery method for fuel cells from air and fuel impurities, particularly CO in $H_2$ (Colbow et al., U.S. Pat. No. 6,472,090; Adams et al., U.S. Pat. No. 7,038,424; Reiser et al., U.S. Pat. No. 6,841,278). While the precise reason for the observed fuel cell recovery during air starvation remains unclear, water production, heat generation, and catalyst poison reduction are all cited as reasons for performance recovery (Colbow). While periodic air starvation may have many benefits for fuel cells, it should not be capable of removing adsorbed sulfur species from the cathode surface because sulfur species must be oxidized and not reduced to remove them from the surface. This requires the use of an external power supply, such as cyclic voltammetry. A provisional patent discusses using cyclic voltammetry to strip $SO_2$ from the surface of the Pt, but does not provide a means to develop the proper reaction environment for CV during the operation of a fuel cell (Uribe et al., US Patent Appl. Pub. No. 2006/0249399).

In PEMFCs, the most common way to cycle the potential of an electrode is cyclic voltammetry (CV) using a potentiostat. The PEMFC feed streams are switched from $H_2$|air to $H_2$|$N_2$ for conducting CV experiments; the cell voltage drops from 0.60 V to 0.05 V and adsorbed sulfur species on the cathode catalyst are reduced at low potentials to $S^0$. During the anodic sweep above 0.9 V vs. a reversible hydrogen electrode (RHE), the surface adsorbed $S^0$ is oxidized to water soluble sulfate as in Eq. 2 (Contractor et al., *Journal of Electroanalytical Chemistry*, 93, 99 (1978); LOUČKA, *Journal of Electroanalytical Chemistry*, 31, 319 (1971); Spotnitz et al., *Electrochimica Acta*, 28, 1053 (1983)).

Sulfate ($SO_4^{2-}$) products can protonate to bisulfate ($HSO_4^{1-}$) in acidic media (Pourbaix, *Atlas of Electrochemical Equilibria in Aqueous Solutions*, Pergamon, New York (1966)). The exact identity of the water soluble sulfur anion after oxidation is currently unknown; the water soluble sulfur anion will therefore be referred to as (bi)sulfate in the proceeding text to denote the possible existence of either sulfur anions (Ramaker et al., *Journal of Physical Chemistry C* (2010)). At this point in the recovery process, the negatively charged (bi)sulfate anion is still bound to the surface by coulombic interactions with the positively charged electrode. During the cathodic sweep below 0.17 V vs. RHE, the (bi)sulfate anion desorbs below the point of zero charge (Baturina et al., *Journal of the Electrochemical Society*, 156, B1423 (2009)).

CV, as it is typically performed in the laboratory, cannot be used as an operational recovery method. One standard method requires disconnecting the electrical load for extended periods of time (typically 2 h), flushing the cathode with an inert gas such as Ar or $N_2$, and cooling the cell to 35° C. Furthermore, to oxidize the sulfur to (bi)sulfate, it is common practice to perform CV scans up to 1.4 V vs. RHE (Garsany et al., *Journal of the Electrochemical Society*, 154, B670 (2007)). The potentials needed for sulfur oxidation coincide with potentials for Pt dissolution and carbon oxidation (Darling et al., *Journal of the Electrochemical Society*, 150 (2003); Meyers et al., *Journal of the Electrochemical Society*, 153 (2006)). At potentials above 0.8 V vs. RHE, Pt dissolution and carbon oxidation become active processes that reduce the life time of the catalyst. A recovery method utilizing oxidizing potentials must balance the competition between oxidizing the catalyst and the contaminant.

A recovery method capable of removing contaminant species from the catalyst surface and restoring activity over the entire polarization curve is useful both as a maintenance procedure and during PEMFC operation to sustain performance in harsh environments. To prevent contamination in practical environments, a possible solution for operating PEMFCs in contaminated air is to purify the incoming air with existing air purification technologies (filters, absorbers, etc.). However, air purification systems are vulnerable to contaminant bypass because of misuse, material saturation, and component attrition.

BRIEF SUMMARY

Disclosed herein is a method of improving the electrical performance of an operating fuel cell catalyst-containing cathode in a fuel cell connected to an electrical load comprising: reducing the flow of air to the cathode; disconnecting the load from the fuel cell; connecting a potentiostat to the fuel cell; cycling an applied voltage, current, or power to the fuel cell one or more times; disconnecting the potentiostat from the fuel cell; reconnecting the load to the fuel cell; and resuming the flow of air to the cathode.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
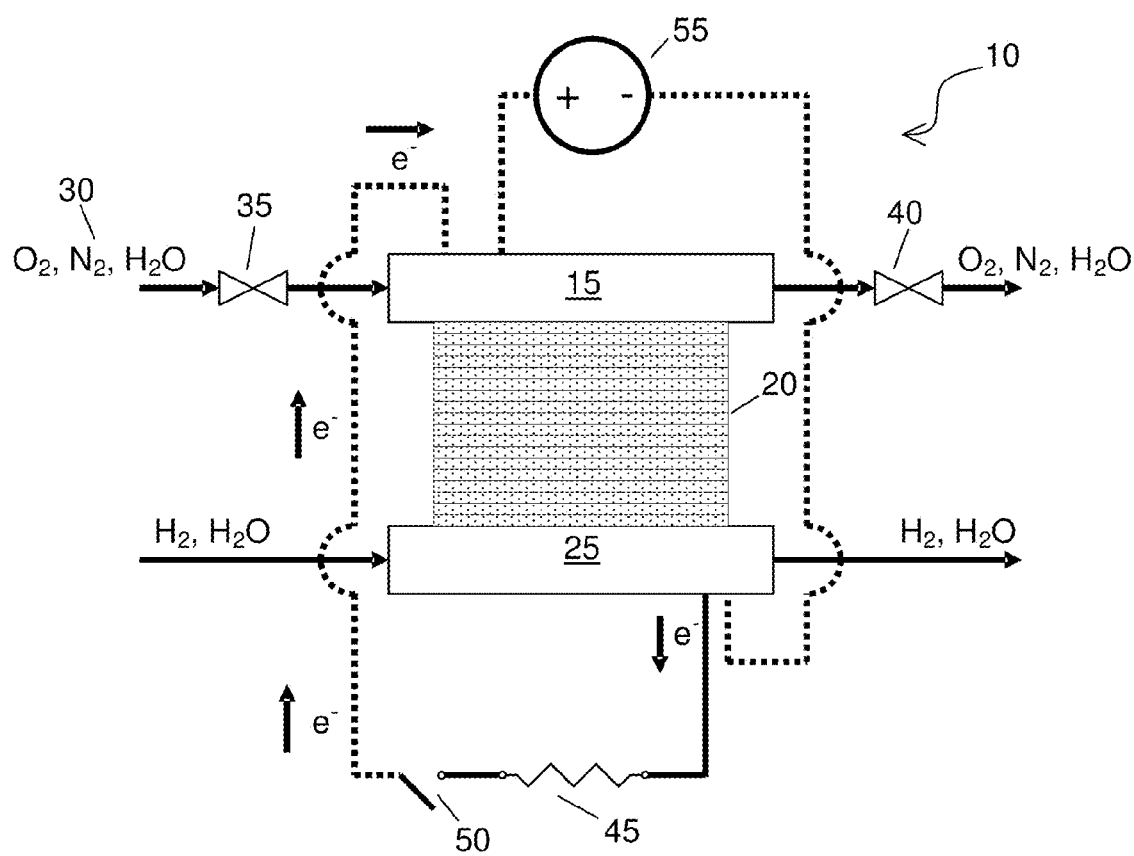
FIG. 1 shows a process flow diagram of PEM fuel cell recovery.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a method for the rapid recovery of a deactivated PEMFC cathode, without the use of an external inert gas. The oxygen in the air is consumed by the cathode, leaving behind a gas mainly composed of nitrogen, thus allowing electrochemical recovery of the Pt or other catalysts at high potentials without the occurrence of irreversible oxidation processes (Gould et al., "Operational performance recovery of $SO_2$-contaminated proton exchange membrane fuel cells" *J. Electrochem. Soc.* (in press)).

The method uses a fuel cell during an operational period to power an electrical load, and begins by reducing the existing flow of air to the cathode. The air may be atmospheric air or any supply of gases that permit operation of the fuel cell. One or more valves, pumps, or any other devices compatible with the fuel cell may be used to reduce the flow. "Reducing" refers to either a partial reduction of the flow or a total stoppage of the flow. For example, the flow may be reduced by at least 1%, 10%, 50%, 80%, or 90%. At the time of the reduction, a supply of oxygen remains in contact with the cathode.

The load is then electrically disconnected or otherwise removed from the circuit, and a potentiostat is electrically connected. These changes to the circuit may be performed by switches or any other devices compatible with the fuel cell. The potentiostat may be any device that can apply the required voltages to the fuel cell.

The potentiostat then applies a cyclic voltage to the fuel cell. For example, the low end of the range may be less than 0.1 V, such as 90 mV, and the high end of the range may be 1.1-1.5 V. There is no limit to the number of cycles but in some cases, 1-5, 1-20, or up to 25 cycles may be sufficient. Any voltage ramp rate may be used, including, but are not limited to, a ramp in the range of 20-800 mV/s or 5-1500 mV/s. The ramp rate need not be a constant, and the parameters of the cycling may be different from one cycle to the next. The applied voltage may also be stated as a current or power. A suitable range for an applied current is from a low of less than −600 $mA/cm^2$ to a high of greater than +600 $mA/cm^2$. A suitable range for an applied power is from a low of less than −1 $W/cm^2$ to a high of greater than +1 $W/cm^2$.

When the voltage is raised in each cycle, some of the sulfur or other contaminant bound to the catalyst may be oxidized by water or other oxidant to a sulfate ion, as in Eq. 2 above, or other oxidized species. At the low end of the applied voltage, the sulfate may desorb from the surface of the catalyst and be removed from the cell by any current or subsequent air flow. The voltage sweeping may continue until all or a desired amount of sulfur has been removed from the catalyst surface, and may end at below 0.1 V to remove the last sulfate generated.

After voltage cycling, the potentiostat is disconnected, the load is reconnected, and the flow of air is resumed to restore the system to its previous operational status. The reconnection may be of a different load and the resumption of air flow need not be identical to the original amount.

In some embodiments, the flow of air is completely stopped. This can result in a sealed pocket of the air remaining in contact with the cathode. At this point, operation of the fuel cell may be continued until the fuel cell produces a current below a current threshold (relative to the cathode area) and a voltage less than a voltage threshold. Suitable thresholds include, but are not limited to, 5-15 $mA/cm^2$ and 0.05-0.15V, including 0.09 V. This consumes the oxygen in the isolated air. The voltage cycling described above is then performed.

One possible process flow diagram of the system is illustrated in FIG. 1. The ranges given are exemplary. A PEMFC 10 include a cathode 15, a PEM stack 20, and anode 25. The recovery method starts by isolating the contaminated cathode 15 from the air feed 30. This is accomplished by closing control valves 35 and 40. This places the cathode 15 in a dead end condition. Once control valves 35 and 40 have been closed, current is drawn from the cell 10 until both the voltage and the current collapse to 0 A and 0-200 mV, respectively. This procedure consumes the oxygen present in the air, leaving a humidified $N_2$ atmosphere ready to perform recovery. The inert atmosphere may avoid carbon and Pt corrosion. Next, the load 45 is removed from the stack by opening external switch 50. Once the cell is under an inert atmosphere and the cell is removed from its load 45, it can be cycled between 0.09 to 1.4 V by an external power supply 55 at 50 mV/s. The number of cycles required varies with the specific characteristics of the cell under recovery, but 1-5 is typical. The voltage cycling oxidizes the deleterious contaminants to non-harmful oxide species, e.g. sulfur to $SO_4^{2-}$. Once the contaminants have been oxidized, the flow can be restored and the non-harmful products flushed out by opening control valves 35 and 40. The load 45 can be restored by closing switch 50 and the fuel cell's performance is recovered.

Figure 2:
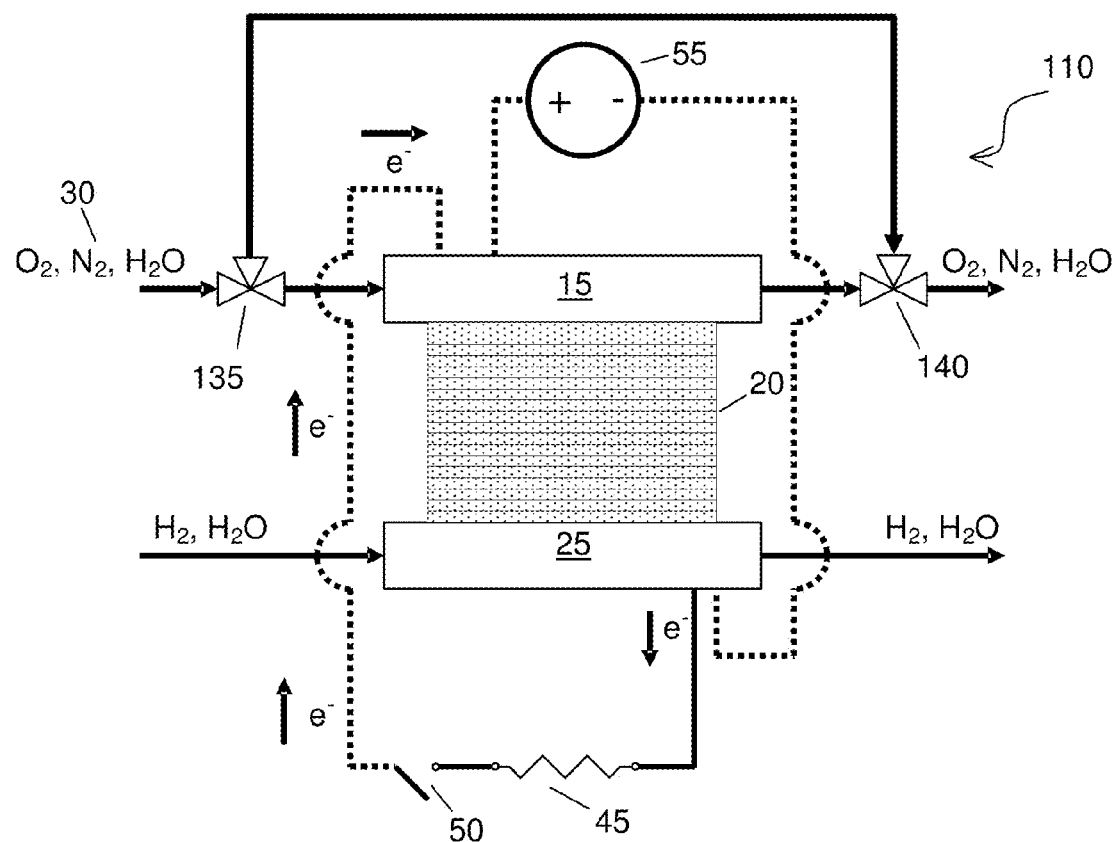
FIG. 2 shows a process flow diagram of PEM fuel cell recovery with cathode by-pass.

Alternatively, diverter valves may be used instead of isolation valves. This schematic is depicted in FIG. 2. The change between FIGS. 1 and 2 is that isolation valves 35 and 40 have been replaced with three-way diverter valves 135 and 140. When valves 135 and 140 are actuated it places the air flow into a bypass position, flowing air around the cathode. This isolates the cathode chamber from the oxidant. Once the cathode is isolated the remaining oxygen can be consumed. A potential advantage of diverter valves is that the pumps in an actual fuel system do not need to be spoiled down in order to perform recovery.

Figure 3:
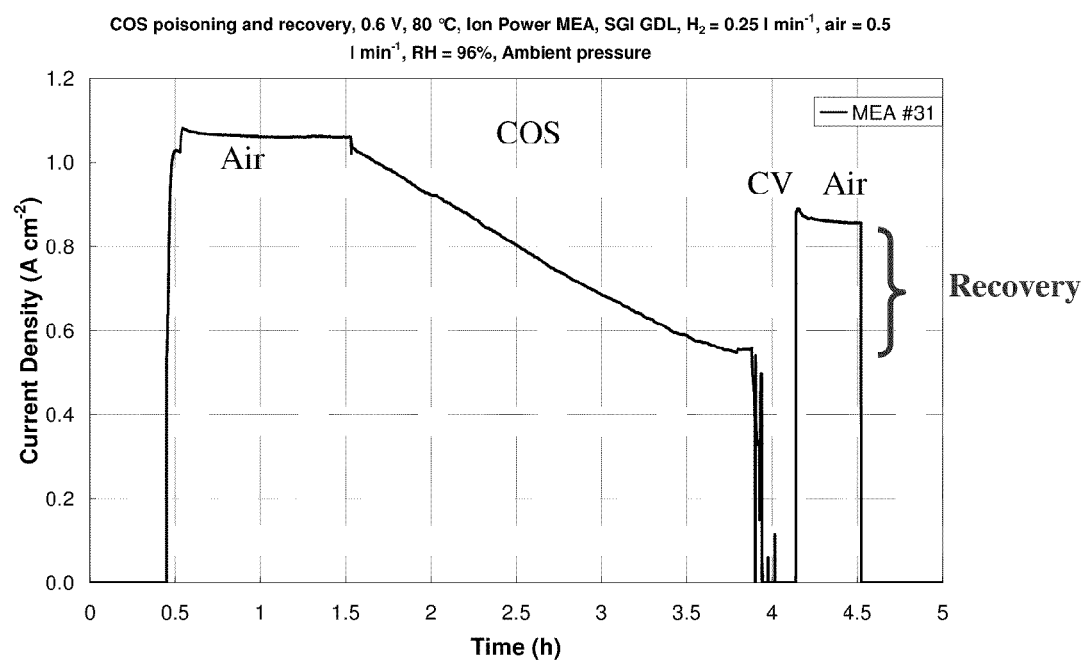
FIG. 3 shows deactivation by 1 ppm COS followed by recovery method shows significant recovery, as measured by current density.

A process using FIG. 1 was initially tested on a single cell MEA deactivated by exposure to 1 ppm carbonyl sulfide (COS) for 2.25 hours. The recovery of the single cell using this method is shown in FIG. 3. With this method it is possible to recover 80% of the cell's current density within 10 min. without the use of an external inert gas. The process may be applicable to $SO_2$ and $H_2S$ contaminants, as well as other organic species and chlorides.

Figure 4:
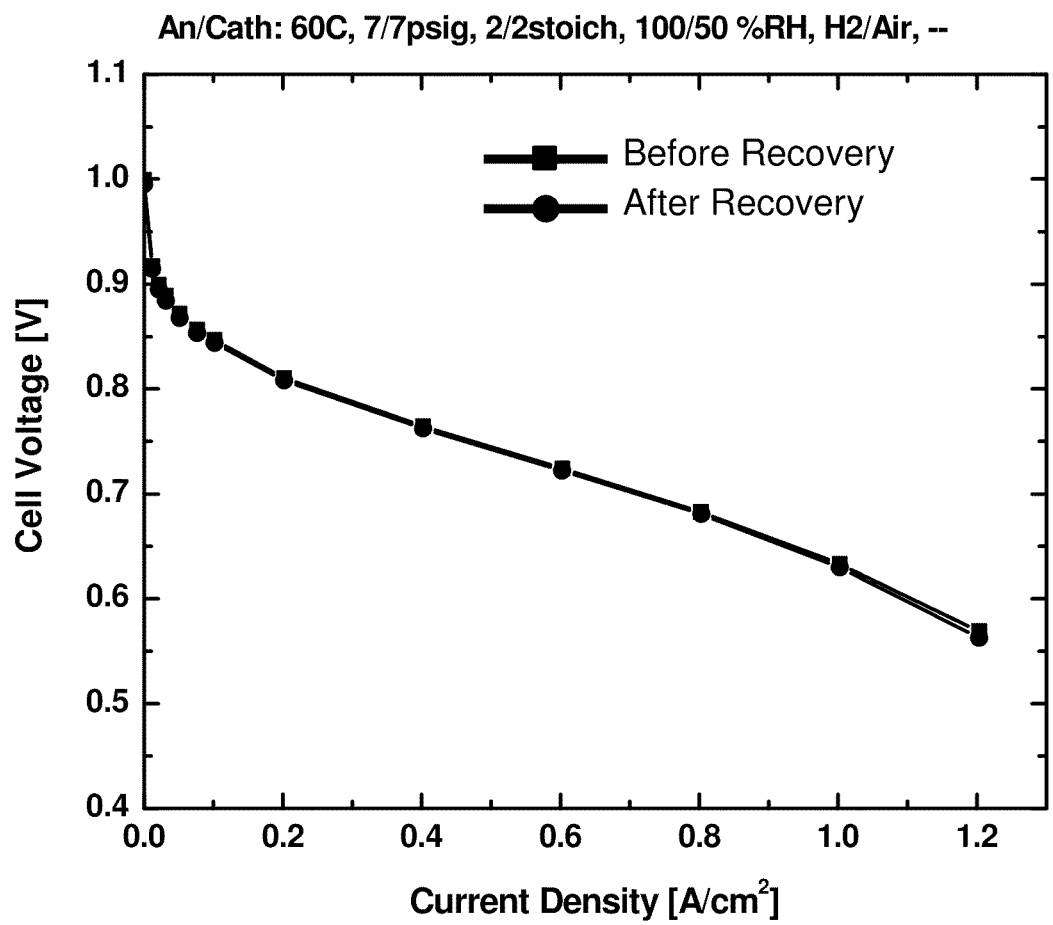
FIG. 4 shows deactivation by 1 ppm $SO_2$ for 1 hour followed by the recovery method shows 100% performance recovery over entire fuel cell operating range.

An automated process was constructed using FIG. 2 as a design. Using this method it was found that is was possible to recover 100% of the fuel cell performance in fewer than 3 minutes without the use of external gas. FIG. 4 shows the fuel cell performance curve before and after recovery. They are virtually identical.

Figure 5:
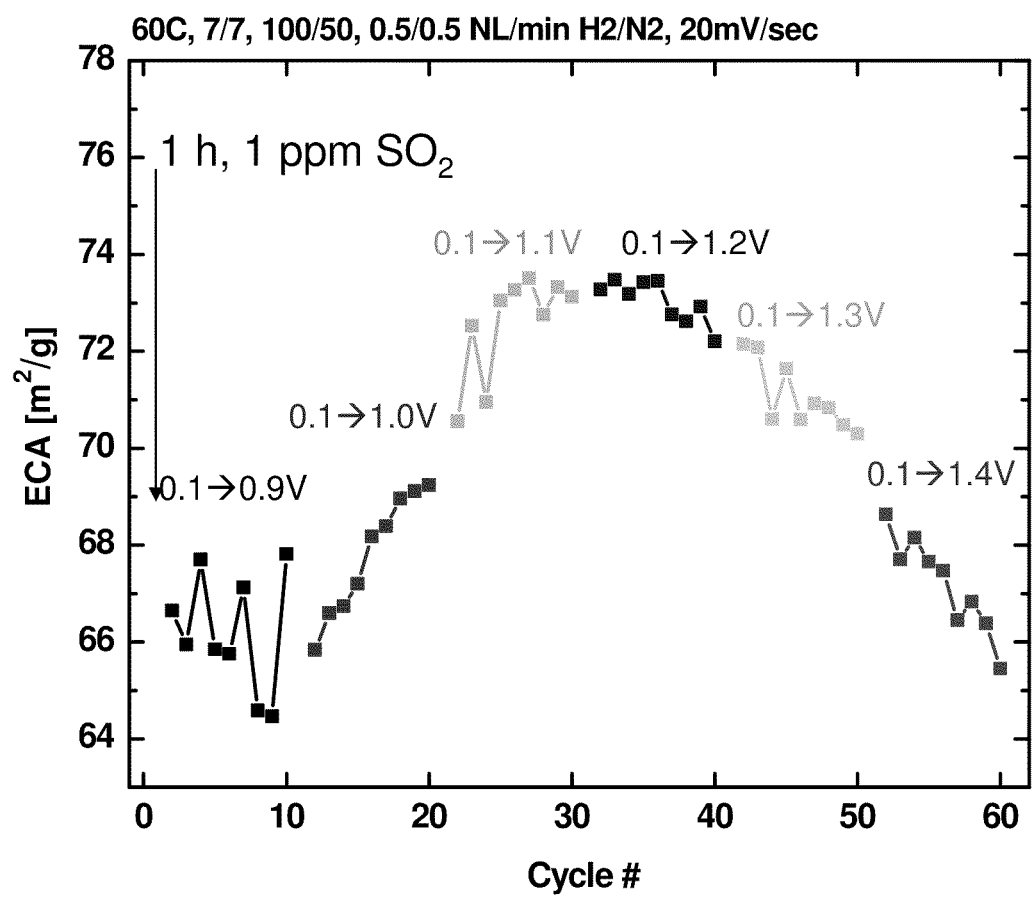
FIG. 5 shows change in catalyst surface area as a function of different upper scan voltage.

Using this setup it was possible to optimize the upper limit of the recovery voltage sweep during cyclic voltammetry. It was found for this specific fuel cell configuration that 1.1 V was optimal for recovery, by maximizing sulfur removal and minimizing damage from Pt oxidization. The optimum recovery voltage can be seen in FIG. 5, which shows that above 1.1V the catalyst active surface area decreases with voltage cycling at higher voltages. The upper voltage of 1.1 V will likely vary with cell operating temperature.

Simply pulsing the cell to a high voltage may not be as effective as the presently disclosed cycling technique for recovering the fuel cell (Uribe et al., US Patent Appl. Pub. No. 2006/0249399). The fuel cell may be cycled below 100 mV in order to reduce the Pt surface and desorb $SO_4^{2-}$ formed during the oxidative sweep to 1.1 V.

The potential advantage of using the method to recover a deactivated fuel cell instead of purging the fuel cell with clean air is that recovery may be both faster and more effective. A 70 hour air purge was capable of recovering 20% of the cell's initial activity (Mohtadi et al., *Journal of Power Sources*, 138, 216 (2004)). In contrast, the present recovery method can achieve 100% recovery within 3 minutes.

Another potential advantage of using this method instead of exposing the cell to open circuit voltages is that recovery with this method may be much faster. Exposing the cell to open circuit voltage takes 3 hours to partially recover the cell performance (Urdampilleta et al., *ECS Transactions*, 11, 831 (2007)). In contrast, the present method may show 100% within 3 minutes. Additionally, this method does not expose the fuel cell to high voltages in an oxygen rich atmosphere, which can lead to the oxidation of the Pt catalyst and the corrosion of the carbon electrode in the MEA.

Another potential advantage is that it does not require an external inert gas because the inert gas is produced inside the cathode during the recovery procedure (Shi et al., *Journal of Power Sources*, 165, 814 (2007)).

Another potential advantage over shutting down the cell is that it does not require the turn down of the entire balance of plant and it does expose the cell to corrosive cell reversal conditions (Takeuchi et al., *Journal of the Electrochemical Society*, 155, B770 (2008)).

Another potential advantage over a simple voltage pulse to 1.4 V is that it produces better recovery in comparable time scales because (bi)sulfate formed at 1.4 V is desorbed at the lower potentials and Pt is reduced (Uribe et al., US Patent Appl. Pub. No. 2006/0249399). It does not require that the gas flows be stopped and it doesn't over expose the cell to voltage were Pt oxidation is detrimental to catalyst surface area.

The following examples are given to illustrate specific applications. These specific examples are not intended to limit the scope of the disclosure in this application.

Example 1

PEMFC Materials and Setup—All $SO_2$ contamination and recovery experiments were performed with commercially available 50-cm² Ion Power membrane electrode assemblies (MEAs), which were replaced after each contamination experiment. The anode and cathode catalysts were both 50 wt. % Pt supported on Vulcan carbon (VC), with a Pt loading of 0.4 $mg_{Pt}/cm^2$ (geometric). Membrane and electrode thicknesses were determined from MEA cross sections via scanning electron microscope (SEM) imaging. The NAFION® membrane (NRE 211) was 25-26 μm thick, and both electrodes were 13-14 μm. Cell assembly details are reported elsewhere (Bender et al., *Journal of Power Sources*, 193, 713 (2009)). The gas diffusion layers were SGL 25BC. FCATS™ G050 series test stations from Green Light Power Technologies, Inc. were used to conduct the PEMFC experiments. All gases used were of UHP purity (99.999%), except during exposure to $SO_2$, in which 93-ppm $SO_2$ in air was diluted to 1-ppm $SO_2$ in air using the equipment and method for contaminant exposure described previously (Bender).

The apparatus from FIG. 2 was used. A Solartron 1287 potentiostat was used for low scan rates (20-200 mV/s) and low currents (<2 A). A Parstat 2273 potentiostat with a Kepco ±20 A current booster was used for high scan rates (>200 mV/s) and high currents (>2 A).

Example 2

Testing Procedure—Experiments consisted of five phases: (i) beginning of life (BOL) conditioning and diagnostics to verify the full functionality of the MEA before being placed on test set-up, (ii) beginning of test (BOT) diagnostics to determine baseline behavior at experimental conditions; (iii) a constant voltage hold experiment that includes the contaminant exposure, (iv) the recovery method, and (v) end of test (EOT) diagnostics to evaluate the effectiveness of the recovery method. The details of the BOL diagnostics and conditioning procedures used are described elsewhere (Bender). BOT diagnostics consisted of the determination of the cathode's electrochemically active area (ECSA) via CV and the initial cell performance via a polarization curve.

The ECSA method was as follows: CV anode|cathode operating conditions were 48.3|48.3 $kPa_g$ outlet back pressure, 100|50% relative humidity (RH), 466|466 sccm $H_2|N_2$ flows, and 60° C. cell temperature. Five scans were conducted from 0.09 V to 1.2 V vs. the potential at the anode at a scan rate of 20 mV/s using a Solartron 1287 potentiostat. Polarization curves were conducted at the same conditions as CV, except that $H_2$|air were flowed to the anode|cathode electrodes with stoichiometric flow rates of 2|2. Polarization curves were performed in current control mode starting at a current density of 1.2 A/cm² and then decreasing the load in 200 mA/cm² steps towards open circuit configuration. From 200 mA/cm² onward, the flow rate was kept constant and measurement points are taken at 100, 75, 50, 30, 20, and 10 mA/cm², and open circuit. To determine polarization curve data points, each current density was held for 15 min, while the data of the last 5 min was averaged to determine a voltage value. Subsequently, the cell was held for 1 min at the open circuit configuration and the maximum recorded voltage was used as the open circuit voltage (OCV) of the polarization curve.

After completion of the BOT diagnostics, the cell was operated at 0.6 V in neat $H_2$|air at the same operating conditions of the polarization curves. After 3 h of operation, the cell was exposed to 1-ppm $SO_2$ in air for 3 h, applying a total contaminant dosage of 16 μmol of $SO_2$.

Subsequent to $SO_2$ exposure, the cell was purged in neat $H_2$|air for 1 h before various recovery methods were applied at various conditions. The effectiveness of the recovery methods were evaluated at current density losses greater than 25%. The degree of current density loss at which recovery was tested was intentionally chosen around 25% to avoid testing recovery methods at a $SO_2$ saturation condition, yet to be large enough to observe changes in current density after recovery (Zhai et al., *Journal of the Electrochemical Society*, 157 (2010)). After the recovery method was performed, the effectiveness of each method and the state of the MEA were characterized with a set of EOT diagnostics. These diagnostics consisted of a polarization curve and the determination of the cathode ECSA at operating conditions identical to BOT operating conditions.

analytical tests performed during BOT and EOT with the recovery method. This method was also employed to determine the effect of the upper vertex potential on the degradation of the cathode and to optimize the employed scan range for evaluation of the proceeding recovery methods.

TABLE I

Sequence of Steps for Driven Cell Recovery Methods

| Step No. | Action | Cycling in situ $N_2$ | Hold in situ $N_2$ | Cycling in air | Hold in air |
|---|---|---|---|---|---|
| 1 | Switch the cell to voltage control mode at 0.6 V. | X | X | | |
| 2 | Actuate valves V1 and V2 to force the air feed stream to bypass the cathode. This is done while the cell is under load and a current is drawn from the PEMFC. | X | X | | |
| 3 | Generate in situ $N_2$ by consuming the $O_2$ at the cathode at the applied cell voltage of 0.6 V until the current density decreases below 5 mA cm$^{-2}$. | X | X | | |
| 4 | Set the cell to open circuit conditions. | X | X | | |
| 5 | Wait until cell voltage decreases below 0.09 V. | X | X | | |
| 6 | Disconnect cell from the electrical load and connect to a potentiostat. | X | X | X | X |
| 7 | Perform potential cycling experiments to induce recovery. | X | | X | |
| 8 | Perform potential hold experiments to induce recovery. | | X | | X |
| 9 | Disconnect the potentiostat from the cell. | X | X | X | X |
| 10 | Reconnect the electrical load which is in open circuit configuration. | X | X | X | X |
| 11 | Switch valve V1 back to its original position to allow air to pressurize the cell. | X | X | | |
| 12 | After one second, open valve V2 to allow air to pass through the cell. | X | X | | |
| 13 | Resume PEMFC operation by setting the appropriate control mode and operating point. | X | X | X | X |

Example 3

Driven Cell Recovery by Potential Cycling with in situ $N_2$—The entire automated recovery is described in Table I. Steps 1-5 prepared the cell for a driven cell experiment while preventing the cell voltage from being inverted. In situ $N_2$ was generated (i.e., $N_2$ concentration was increased) in step 3 when the air flow was bypassed from the cathode, and the $O_2$ in the air in the cathode compartment was electrochemically consumed to leave predominantly $N_2$. After the air flow was cut off, the current dropped from an initial value near 800 mA/cm$^2$ to below 5 mA/cm$^2$, indicating that current was only resulting from $H_2$ crossover and not from oxygen reduction. In step 5, the cell voltage dropped to 0.09 V as further evidence that only humidified $N_2$ and some crossover $H_2$ was present at the cathode electrode. Steps 6, 7, and 9 enable driven cell experiments with potential cycling. The potential range was varied from 0.09 V vs. the potential at the anode to an optimum upper vertex potential ranging between 0.9 V and 1.4 V vs. the potential at the anode. Scan rates were varied from 20-800 mV/s and experiments employed between 10 and 25 cycles. Steps 10-13 switched the cell back to regular PEMFC operation and completed the recovery method. Following the optimization study, potential cycling was carried out by scanning between 0.09 and 1.1 V vs. the potential at the anode. The major difference between CV and potential cycling is that CV takes place in a well-defined cathode atmosphere. A distinction is made between potential cycling and CV so as not to confuse the

Example 4

Driven Cell Recovery by Potential Cycling in Air—This example is also analogous to the driven cell recovery methods in Example 3, but carried out with the cathode under flowing air. Instead of Steps 1-5, the cathode flow rate was lowered to 332 sccm in order to limit the ORR currents generated during the recovery process. Once the cathode flow rate was lowered, the potentiostat was connected to the cell and driven cell recovery in air was performed by following Steps 6, 7, and 9-12. The potential cycling program was between 0.09 and 1.1 V, starting at OCV (0.96 V) for the first cycle.

Comparative Example 1

Driven Cell Recovery by Potential Hold with in situ $N_2$—This example is similar to Example 3 with the cathode under in situ $N_2$, except that the cycling step 7 was omitted, and instead the cell was held at a constant potential in step 8. The potential hold step consisted of a rapid potential ramp followed by a 60 s potential hold at 1.1 V vs. the potential at the anode.

Comparative Example 2

Driven Cell Recovery by Potential Hold in Air—Driven cell recovery by potential hold in air used the same sequence as driven cell recovery by potential cycling in air as shown in Table I with one exception; different potential programs were used for the two recovery methods in Step 7. The potential hold in Step 8 consisted of a rapid potential ramp followed by a 60 s potential hold at 1.1 V vs. the potential at the anode.

Comparative Example 3

Non-Driven Cell Recovery by Load Cycling—Recovery of PEMFC polarization curve performance by load cycling was accomplished by running successive polarization curves after the cell was exposed to $SO_2$. The procedure for recovery by load cycling did not use the sequence in Table I because it did not use a potentiostat. Instead of cycling the cathode's potential with a potentiostat, the cell's current densities were varied between 0.0 and 1.2 A/cm$^2$ using the test stand's load bank. The PEMFC conditions and load profile during recovery by load cycling were identical to those during the polarization curve BOT diagnostics. Unlike the previous polarization curve plots, the polarization curves in FIG. 7a are from a single MEA.

Example 5

Figure 6:
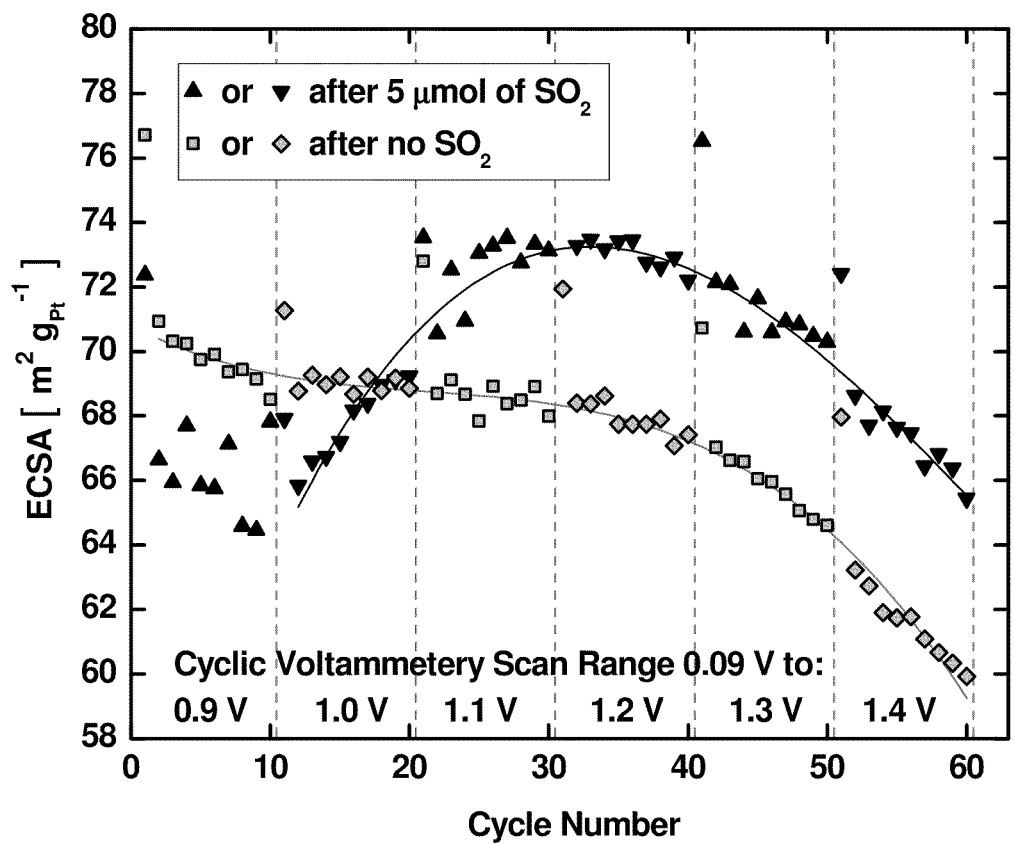
FIG. 6 shows a comparison of the electrochemical surface area (ECSA) during potential cycling with in situ $N_2$. Six sets of potential cycles containing 10 scans each were performed with increasing upper vertex potentials (0.9 V, 1.0 V, 1.1 V, 1.2 V, 1.3 V, 1.4 V) vs. the potential at the anode at 60° C. Shaded alternating triangles with black lines are the ECSA values during recovery of a Pt-cathode with sulfur species on the surface and open alternating rhombi with gray lines are the ECSA values during recovery of a Pt-cathode without sulfur species on the surface.

Optimization of Upper Vertex Potential during Cycling for Pt ECSA—The results are shown in FIG. 6 for the experiments conducted to determine the effect of the upper vertex potential on the degradation and recovery of the cathode in terms of the platinum ECSA. The ECSA was decreased by adsorbed sulfur species blocking the active surface area. Platinum nanoparticles also lost surface area at high potentials due to platinum oxidation and dissolution. The corrosion process takes place primarily due to water; therefore, corrosion is focused on only under the in situ $N_2$ environment (Darling et al., *Journal of the Electrochemical Society*, 150 (2003); Meyers et al., *Journal of the Electrochemical Society*, 153 (2006)).

The solid triangles represent data from the cathode that was recovered by potential cycling with in situ $N_2$ after exposure to $SO_2$, and the shaded rhombi represent data of a control experiment series in which the recovery method was applied without exposing the cathode to $SO_2$. The two curves connecting the symbols are visual guides to help distinguish the trends. In each series of experiments, the upper vertex potential was increased from 0.9 to 1.4 V in steps of 100 mV vs. the potential at the anode after a set of 10 cycles was completed at each vertex potential. The ECSAs are measured here from the hydrogen desorption region at 60° C. in the in situ humid nitrogen atmosphere generated during the potential cycling recovery method. This approach yields ECSAs that are 10% less than those measured for the BOT and EOT tests at 35° C. in low-flowing $N_2$, but provides valid trends for optimizing a recovery method at PEMFC operating conditions.

The initial ECSA for the control and recovery experiments were 76 and 69 m$^2$/g$_{Pt}$, respectively. Note that after the potential of the upper vertex is changed, the ECSA is high. This is due to an artifact in the voltammograms during the measurement of the ECSA in which the H oxidation-desorption peak area of the anodic scan changes shape after the first scan, but becomes stable with subsequent scans. This may be related to crossover $H_2$ accumulating in the cathode compartment or a surface rearrangement that occurs after the cell experiences potentials above 0.8 V.

FIG. 6 shows that for the control experiment (the MEA without contaminant exposure, shaded rhombi), the ECSA values begin to decrease at vertex potentials above 1.1 V vs. the potential at the anode, i.e. cycle number>30. This indicates a loss of Pt active sites due to the exposure to high potentials. The loss of ECSA can be attributed to carbon and Pt corrosion associated with greater oxidizing potentials. Thus, potentials over 1.1 V should be avoided to minimize accelerated PEMFC degradation.

The recovery experiment for the $SO_2$-contaminated MEA (solid triangles) indicates maximum ECSA values at scans 25-30 when using an upper vertex potential of 1.1 V vs. the potential at the anode. The maximum ECSA is 97% of the cathode's initial ECSA. Subsequently, at further increased vertex potential, the results matched those of the control data and the ECSA decreased sharply with increased upper vertex potentials. The maximum value represents optimal tradeoff between the completion of sulfur removal by oxidation and surface loss from carbon and Pt oxidation.

In other reported experiments on $SO_2$-contaminated MEAs, the Pt ECSA did not recover until the upper vertex potential was above 0.9-0.95 V vs. the potential at the anode in CV and that a maximum ECSA was reached when the upper vertex potential was 1.15 V vs. the potential at the anode (Fu et al., *Journal of Power Sources*, 187, 32 (2009)). These results agree with the present work showing similar values for both the onset of ECSA recovery and the maximum ECSA. Fu et al. did not observe the precipitous drop in ECSA above 1.2 V vs. the potential at the anode as in this work. This difference is likely caused by the fact that Fu et al. only performed two scans at each potential.

It is concluded that the optimal upper vertex potential for potential cycling is 1.1 V vs. the potential at the anode. This value is used in the following recovery experiments, but will likely depend on PEMFC operating temperature and catalyst materials and should be determined for each system individually.

Example 6

Figure 7:
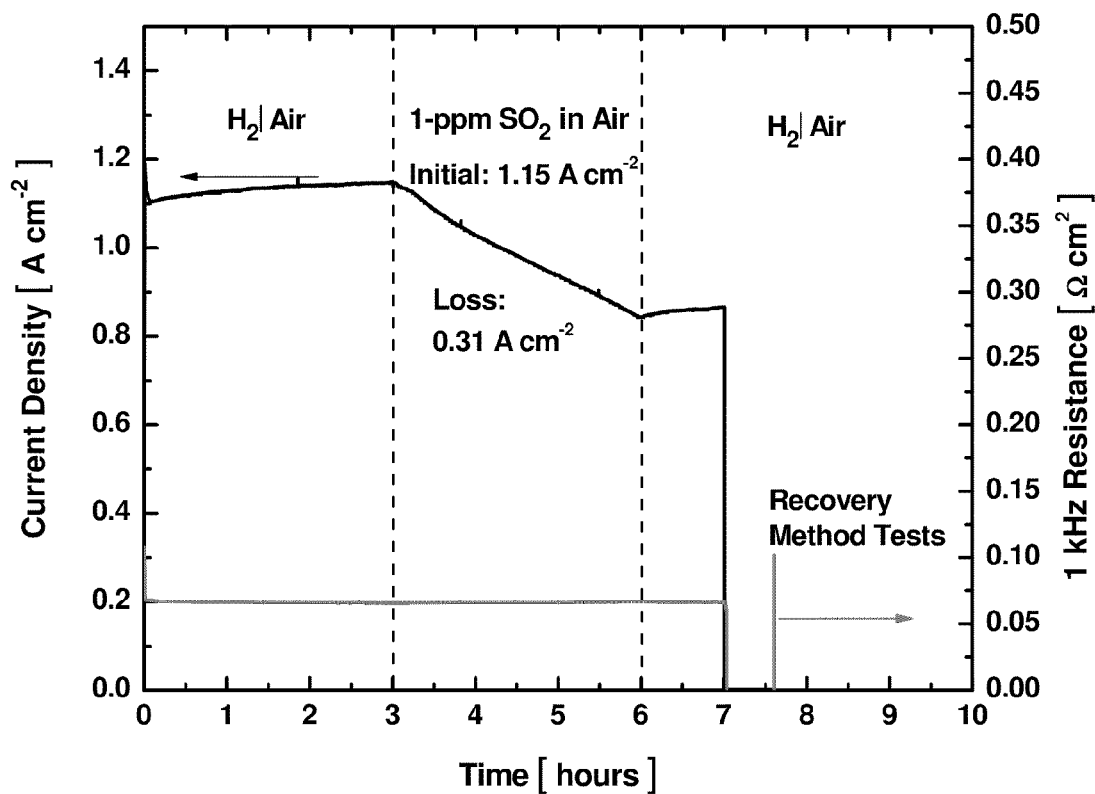
FIG. 7 show typical current density response to 1-ppm $SO_2$ at a constant voltage of 0.6 V, 60° C., 100%|50% RH, and total flow rate 836|1991 sccm. Experiment consisted of pre-poisoning phase to reach steady state current densities, $SO_2$ exposure (16 μmol of $SO_2$), $H_2$|air purge, and recovery method testing phase.

Performance Loss Caused by $SO_2$ Contamination—FIG. 7 displays the time-dependent current density of a PEMFC during exposure of the cathode to $SO_2$ in air. This baseline trend in current density is qualitatively consistent with those previously reported; quantitative differences exist due to differences in the total $SO_2$ dosage relative to total Pt area, relative humidity, back pressure, flow fields, and cell area (Gould et al., *Journal of Power Sources*, 188, 89 (2009); Baturina et al., in *Proceedings of Power Sources*, p. 185, Philadelphia, Pa. (2008); Baturina et al., *Journal of the Electrochemical Society*, 156, B1423 (2009)). The current density of the cell increases slightly during 0-3 h because the surface is recovering from Pt-oxide formation. Exposure of the cathode to 1-ppm $SO_2$ in air for 3 h decreases the PEMFC's current density by ~27%. Following this $SO_2$ contamination, neat air is introduced into the cathode and the recovery is minimal (2%). The limitations of recovery in neat air have been shown numerous times and demonstrate the need for recovery methods (Mohtadi et al., *Journal of Power Sources*, 138, 216 (2004); Mohtadi et al., *Electrochemical and Solid State Letters*, 6, A272 (2003); Mohtadi et al., *Applied Catalysis B-Environmental*, 56, 37 (2005)).

Example 7

Figure 8:
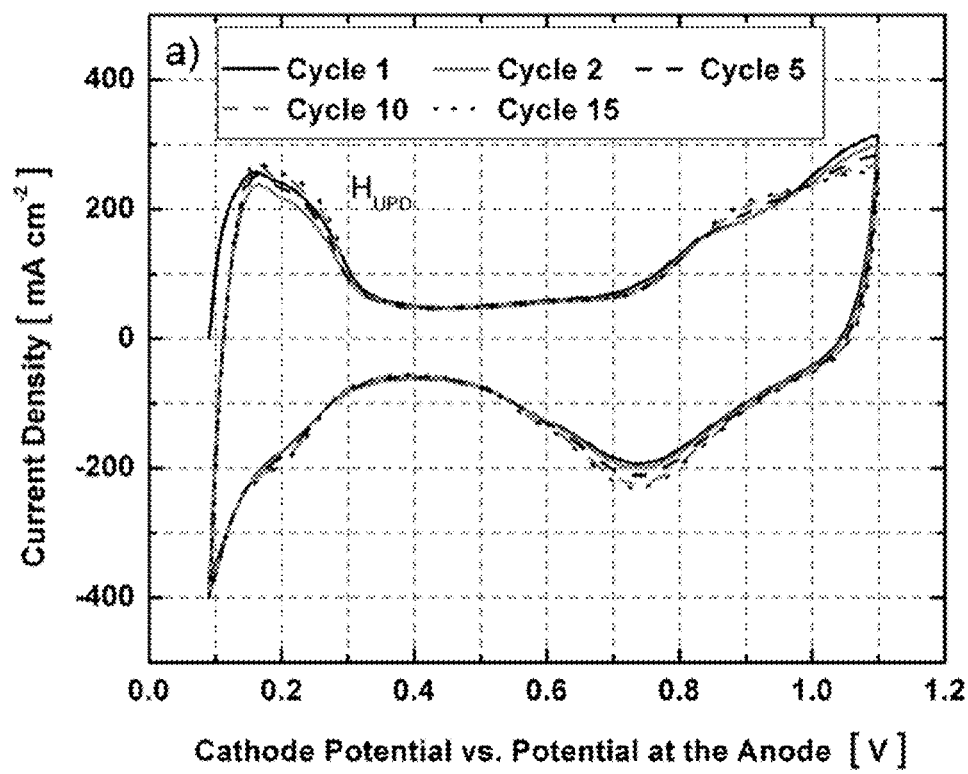
FIG. 8 shows a) select voltammograms during recovery by potential cycling with in situ $N_2$ at 60° C. after exposure to 1-ppm $SO_2$ in air for 3 h (32 μmol of electrochemically active Pt exposed to 16 μmol of $SO_2$). Potential program: 0.09 V→1.1 V→0.09 V, 16 cycles, 800 mV s$^{-1}$. b) Polarization curves showing the PEMFC's initial performance, performance after exposure to $SO_2$, and after potential cycling. The inset depicts the kinetic region of the polarization curve in Tafel coordinates (cell voltage corrected for Ohmic loss vs. current density corrected for $H_2$ crossover current).
Figure 8:
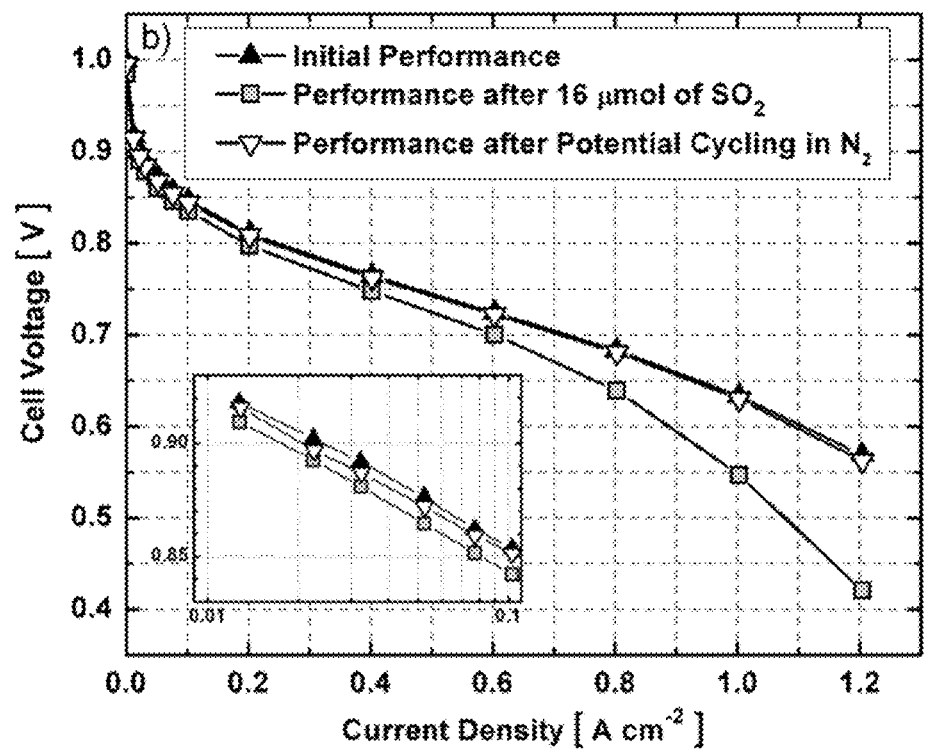

Driven Cell Recovery by Potential Cycling between 0.09 and 1.1 V with in situ $N_2$—Select voltammograms during the potential cycling recovery process are shown in FIG. 8. The voltammograms during potential cycling show the characteristic Pt oxidation and reduction features as well as sulfur oxidation features above 0.8 V that are familiar in CV. The $H_{UPD}$ region increases with successive cycles as the sulfur is oxidized to (bi)sulfate and Pt surface sites are liberated as (bi)sulfate dissolves into the aqueous phase. The voltammograms at 800 mV/s are slightly resistive, but this is understandable considering the large current densities generated at this high scan rate.

The effectiveness of the driven cell recovery method with in situ $N_2$ was determined by evaluating the performance of the cell before and after recovery. FIG. 8b shows three polarization curves conducted with two MEAs. For one MEA, polarization curves were conducted to measure initial performance before contamination with $SO_2$ (solid triangles) and the performance after potential cycling with in situ $N_2$ and an optimized potential scan range (open triangles). The other MEA (squares) was contaminated with $SO_2$ and the polarization curve was measured with sulfur species on the Pt-cathode surface. The polarization curve with sulfur species quantifies the impact of $SO_2$ on PEMFC performance. It also is meant to act as a reference against which the effectiveness of a recovery method can be measured. The polarization curve of the MEA with $SO_2$ on the surface (squares) shows a significant loss of performance over the entire current density range of the polarization curve when compared to the polarization curve of the MEA prior to contamination with $SO_2$ (solid triangles). The MEA that was exposed to the same amount of $SO_2$ followed by driven cell recovery with in situ $N_2$ (open triangles) shows nearly complete recovery to the PEMFC's initial performance over the entire current density range of the polarization curve.

The inset in FIG. 8b depicts the kinetic region of the polarization curves in Tafel coordinates for a pristine MEA, $SO_2$-contaminated MEA, and a $SO_2$-contaminated MEA after potential cycling with in situ $N_2$. The inset shows a 10±1 mV difference between the pristine MEA and the $SO_2$-contaminated MEA at current densities of 0.015 to 0.1 A/cm$^2$. Potential cycling improves the performance of the $SO_2$-contaminated MEA to 4±1 mV of the pristine MEA. The power density of the $SO_2$-contaminated MEA after potential cycling normalized by that of the pristine MEA is 0.99 at 0.6 V and 0.92 at 0.85 V.

Recovery with scan rates of 20 mV/s were also evaluated (not shown) for PEMFC recovery. The recovery at lower rates showed qualitatively the same results as at 800 mV/s, with near complete recovery of the initial polarization curve performance and slightly more resolved voltammograms during potential cycling.

The potential cycling portion of the 800 mV/s recovery method takes 42 s. The maximum scan rate was limited by the potentiostat and it is conceivable that even faster scan rates with lower recovery times are possible. The entire operational recovery process, including all gas switching events, requires 144 s. When this recovery method is compared to other recovery efforts in the literature, its advantages are clear. This recovery method can completely recover the PEMFC to its initial performance over the entire range of the polarization curve and does not require cooling, inert gas, or a humid flush during operation (Mohtadi et al., *Journal of Power Sources*, 138, 216 (2004); Nagahara et al., *Journal of Power Sources*, 182, 422 (2008); Shi et al., *Journal of Power Sources*, 165, 814 (2007)).

Example 8

Driven Cell Recovery by Potential Hold at 1.1 V with in situ $N_2$—The chronometric potentiostatic data in FIG. 9a shows the impact of holding a $SO_2$-contaminated MEA at 1.1 V. As the cathode potential is ramped over 2 s from 0.05 to 1.1 V vs. the potential at the anode, the current density increases in the initial 1 s of the experiment due to hydrogen desorption/oxidation and then again as the cell voltage increases over 0.8 V in the sulfur and platinum oxidation regions. Once the MEA reaches 1.1 V and is held constant, the current density due to oxidation drops back to 0 mA/cm.

The polarization curves are shown in FIG. 9b for a pristine MEA, $SO_2$-contaminated MEA, and a $SO_2$-contaminated MEA after potential hold with in situ $N_2$. The rapid potential ramp and hold at 1.1 V did not yield complete recovery of the PEMFC, especially in the kinetic region, which remains virtually unchanged from the MEA with sulfur species on the surface. The inset in Tafel coordinates shows no difference between the polarization curves of the $SO_2$-contaminated MEA before and after potential hold with in situ $N_2$, and both have an overpotential of 13±1 mV compared to the pristine MEA.

The potential hold method is ineffective compared to potential cycling because holding at 1.1 V keeps the surface platinum oxidized and charged to retain the (bi)sulfate anions. In potential cycling, cycling to 0.05 V reduces the oxidized Pt to Pt metal that is needed to continue the catalytic oxidation of $S^0$ to (bi)sulfate and complete the catalytic cycle needed for sulfur oxidation. The low potentials also release the surface charge on the cathode which binds the (bi)sulfate species.

Example 9

Figure 10:
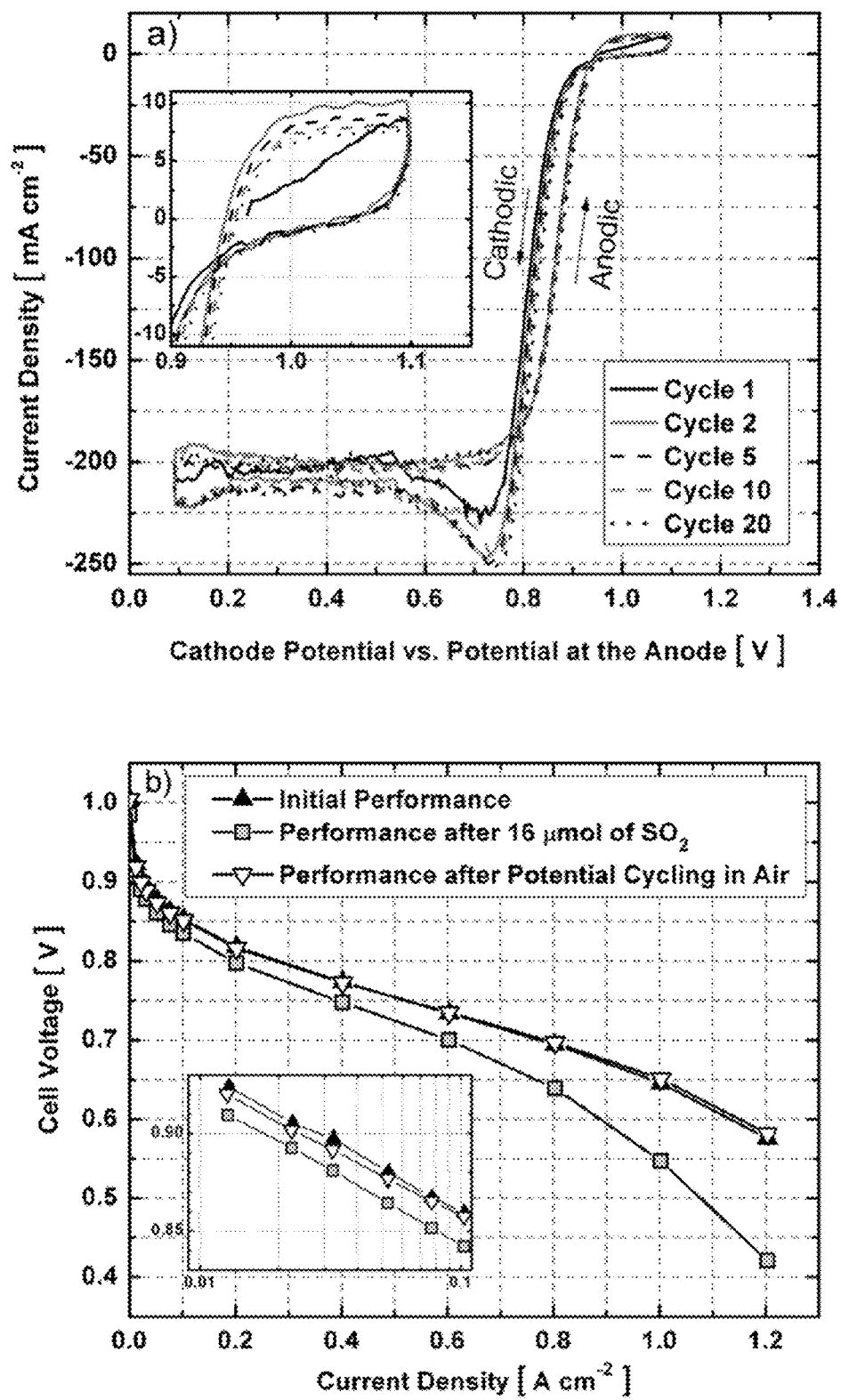
FIG. 10 shows a) select voltammograms during recovery by potential cycling air at 60° C. after exposure to 1-ppm $SO_2$ in air for 3 h (35 μmol of electrochemically active Pt exposed to 16 μmol of $SO_2$). Potential program: cycle 1: 0.95 V→1.1 V→0.09 V; cycles 2-20: 0.09 V→1.1 V→0.09 V, 20 mV/s. b) Polarization curves showing the PEMFC's initial performance, performance after exposure to $SO_2$, and after recovery by potential cycling, with inset depicting the kinetic region of the polarization curve in Tafel coordinates (cell voltage corrected for Ohmic loss vs. current density corrected for $H_2$ crossover current).

Driven Cell Recovery by Potential Cycling between 0.09 and 1.1 V in Air—Select voltammograms of $SO_2$-contaminated MEAs during potential cycling in air at 20 mV/s are shown in FIG. 10a. The voltammograms appear similar to those measured under $O_2$ in aqueous disk electrode experiments; during the cathodic scan (1.1 V→0.09 V), the current densities progressively increase in the ORR kinetic region until they approach a limiting current in the diffusion-limiting region below 0.6 V. Unlike in the in situ $N_2$ studies above, the hydrogen adsorption/desorption region is obfuscated at low potentials, eliminating the Pt ECSA data indicative of the amount of sulfur coverage on each cycle. A reduction feature is present in the cathodic scan at 0.71 V vs. the potential at the anode in the first cycle (solid black) and 0.75 V in each subsequent cycle. This feature is likely attributed with the depletion of $O_2$ in the MEA before a steady state $O_2$-concentration gradient is set up, which is caused by the relatively fast scan rate (20 mV/s) needed for an operational method.

Both $O_2$ and water are present at the cathode in these experiments during sulfur oxidation. The mechanism in Eq. 2 indicates that the sulfur species are oxidized by water and that the role of $O_2$ during recovery is less clear. $O_2$ could participate in recovery directly by oxidizing sulfur species non-electrochemically or indirectly by generating water from ORR locally at the Pt surface.

The inset in FIG. 10a magnifies the Pt and sulfur oxidation wave of the first cycle above 0.95 V. The current of the first oxidation wave is relatively low because the high initial sulfur coverage of the Pt suppresses Pt and sulfur oxidation. The total current of the oxidation wave decreases with each subsequent cycle, as the balance of sites available for Pt and sulfur oxidation changes.

FIG. 10b shows the effectiveness of potential cycling recovery in air of a $SO_2$-contaminated MEA (represented by shaded squares) compared to its performance after 20 cycles (open triangles) and to a pristine MEA (solid triangles). Cycling the $SO_2$-contaminated MEA 20 times in air between 1.1 and 0.09 V vs. the potential at the anode recovers nearly 100% of its performance over the entire current density range. In the kinetic region of the polarization curve (FIG. 10a inset), there is only a slight decrease from the initial performance for the recovered MEA. The slight decrease equates to a 3±1 mV increase in overpotential over the current range shown in the inset. When compared to the $SO_2$-contaminated MEA, the recovered MEA shows a normalized power density of 0.99 at 0.6 V. The total recovery time for 20 cycles at 20 mV/s is 19 min with 17 min of potential cycling and 2 min of system changes (load connecting and disconnecting, etc.).

The EOT diagnostic showed that the ECSA after potential cycling in air was 10% lower than the initial ECSA. This 10% loss did not have an adverse effect on the polarization curve and the loss is comparable to the losses observed after driven cell potential cycling in $N_2$. These experiments confirm no additional corrosion in air vs. inert atmosphere ($N_2$) during potential cycling of the PEMFC above 0.8 V.

Performance recovery in air was attempted at 800 mV/s in order to see if the speed of recovery by potential cycling in air can compete with the speed of recovery by potential cycling with in situ $N_2$. Potential cycling in air at 800 mV/s was not possible because the large ORR currents breeched the potentiostat's current limit during the cathodic scan, even when the air flow rate was set to stoichiometrically limit the PEMFC's current below the potentiostat's current overload threshold. This suggests that even with low flow rates (25 sccm), there is enough oxygen present in the flow field and the gas diffusion layer to generate large currents at these scan rates before a mass transport limiting current is reached.

A potential advantage of recovery in air over recovery with in situ $N_2$ is that diverter valves are not needed in the system, making it lighter and simpler. A potential disadvantage of the recovery in air is that the higher current generated from ORR may necessitate larger electronic components. Using the present implementation of driven cell recovery methods, a potentiostat is used; however, it is easy to envision the development of a hybrid recovery method utilizing the potentiostat for a small potential range above the open circuit voltage (OCV) of $H_2$|air operation and using load cycling for potentials below OCV. This would eliminate the potentiostat current overloads because the system load would accommodate the ORR currents.

Example 10

Figure 9:
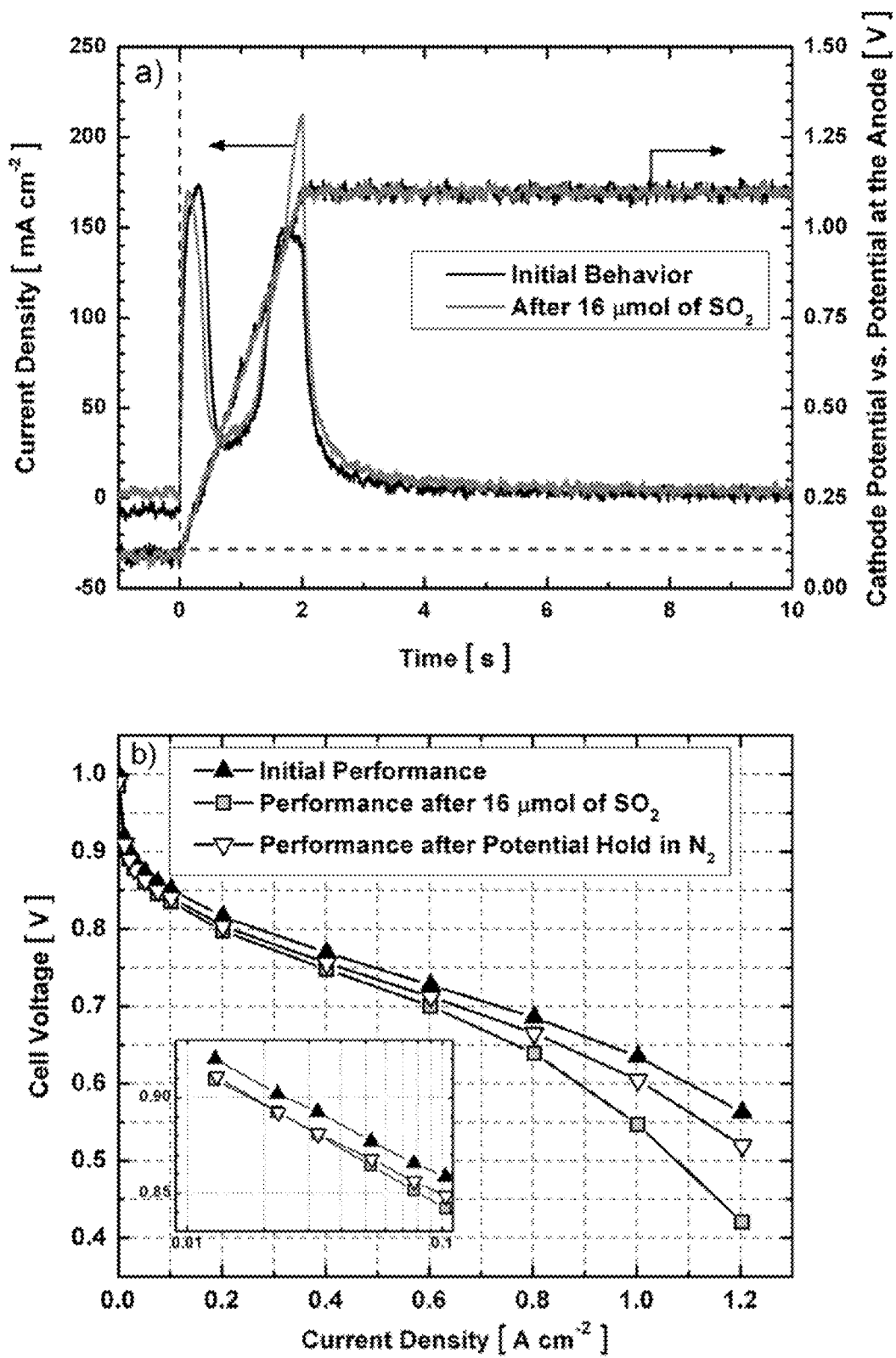
FIG. 9 shows a) transient current density response during recovery by potential hold with in situ $N_2$ at 60° C. after exposure to 1-ppm $SO_2$ in air for 3 h (32 μmol of electrochemically active Pt exposed to 16 μmol of $SO_2$). Potential program: 0.09 V→1.1 V, 500 mV/s, 60 s hold at 1.1 V. b) Polarization curves showing the PEMFC's initial performance, performance after exposure to $SO_2$, and after recovery by potential hold, with inset depicting the kinetic region of the polarization curve in Tafel coordinates (cell voltage corrected for Ohmic loss vs. current density corrected for $H_2$ crossover current).

Driven Cell Recovery by Potential Hold at 1.1 V in Air—A recovery method using a potential hold at 1.1 V in air was explored to see if any improvement could be made over the potential hold with in situ $N_2$. The polarization curve performance of the cell after exposure to $SO_2$ and recovery from a potential hold in air is not shown because it is nearly identical to that of recovery by a potential hold with in situ $N_2$ (FIG. 9). Both recovery methods involving potential holds showed negligible improvement of the cell's performance, demonstrating that potential cycling is crucial to recovery regardless of the cathode's atmosphere (air vs. $N_2$).

Example 11

Figure 11:
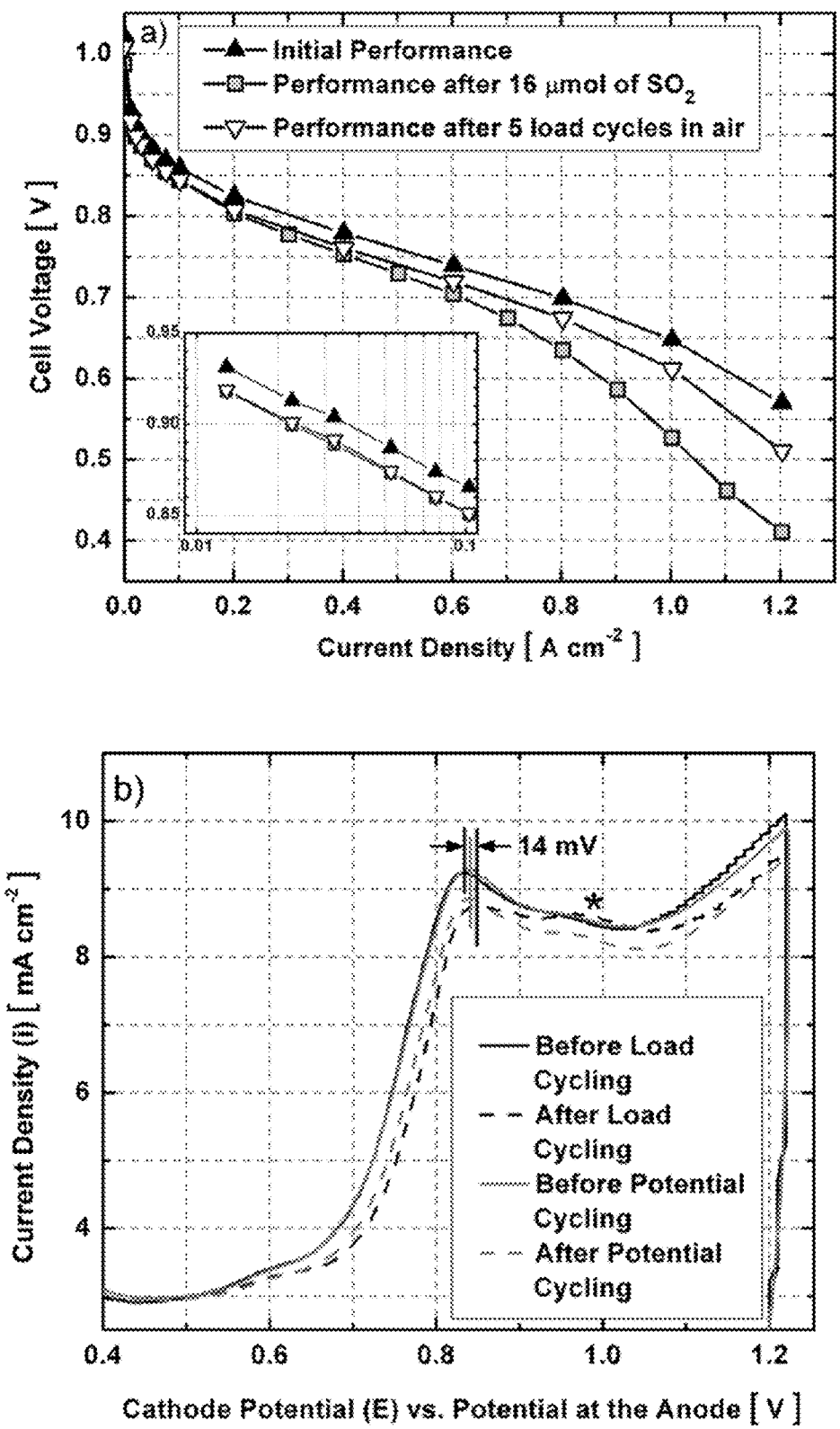
FIG. 11 shows a) polarization curves showing the PEMFC's initial performance, performance after exposure to 1-ppm $SO_2$ in air for 3 h (32 μmol of electrochemically active Pt exposed to 16 μmol of $SO_2$), and after recovery by load cycling between 0.0 and 1.2 A/cm$^2$, with inset depicting the kinetic region of the polarization curve in Tafel coordinates (cell voltage corrected for Ohmic loss vs. current density corrected for $H_2$ crossover current). b) Cyclic voltammograms at 20 mV/s showing the anodic oxidation wave before (BOT) and after (EOT) recovery by potential cycling in air and load cycling in air. The voltammogram after load cycling shows features indicative of (bi)sulfate anion adsorption, explaining the incomplete recovery observed during load cycling.

Recovery by Load Cycling in Air—Previously reported methods were evaluated by which the performance of $SO_2$-contaminated MEAs is recovered by cycling the load between open circuit and typical operating loads while the cathode is held in neat, flowing air (Mohtadi et al., *Journal of Power Sources*, 138, 216 (2004); Nagahara et al., *Journal of Power Sources*, 182, 422 (2008); Gould et al., *Journal of Power Sources*, 188, 89 (2009)). The results are shown in FIG. 11a for an MEA cycled from 0.0 to 1.2 A/cm² in air, correlating to voltages of approximately 1.0 V and 0.4 to 0.6 V, respectively. This test took 80 h to complete 5 polarization curves. The polarization curve measured for the $SO_2$-contaminated MEA (shaded squares) shows a significant increase in overpotential over the entire curve when compared to the pristine MEA (filled triangles). After cycling between 1.0 and 0.6 V in air, the fifth polarization curve (open triangles) shows partial recovery in the ohmic and mass transport regions of the curve; in the kinetic region (inset), the performance is identical to the polarization curve immediately after exposure to $SO_2$. These results match well to those in the literature cited above.

The $SO_2$-contaminated MEA has the same 14±1 mV overpotential in the kinetic region both before and after load cycling (see inset). At 0.6 V, the $SO_2$-contaminated MEA normalized to the power density of the pristine MEA is 0.79 before load cycling and 0.92 after the load cycling. The clear benefit of load cycling is that it can be implemented without modification of the PEMFC system. However, it is impractical because it only partially recovers PEMFC performance and is slow. For these reasons, driven cell recovery methods are clearly superior to load cycling.

The BOT (solid) and EOT (dashed) cyclic voltammograms of the MEAs used in the driven cell recovery by potential cycling in air and load cycling in air tests are plotted in FIG. 11b. The peak potential of the oxidation was determined from differential analysis (di/dE=0) and the positions are marked by a vertical tick. When using CV to detect the presence of (bi)sulfate anions, it is more reliable to plot the derivative of current density with respect to potential and use the derivative to determine the oxidation wave's peak position rather than using visual inspection; otherwise, changes in current density caused by changes in ECSA can be mistaken for shifts in onset potential. Alternative methods for (bi)sulfate detection are to examine the feature at 0.975 V vs. the potential at the anode or sharpening of the features in the $H_{UPD}$ region.

The CV after recovery by load cycling (dashed black line) in FIG. 11b indicates that the (bi)sulfate anion is present on the Pt surface. The presence of (bi)sulfate anion adsorption to the Pt surface is indicated by the shift in oxidation onset potential during the anodic sweep and the sharpening of the feature at 0.975 V vs. the potential at the anode is marked by an asterisk. The inability to completely recover the PEMFC's performance from load cycling is caused by (bi)sulfate anion adsorption to the Pt surface as well as residual sulfur species on the surface.

The voltammograms of cathode MEAs after driven potential cycling in air shown in FIG. 11b have minimal (bi)sulfate anion features, providing more evidence that the driven potential cycling recovery methods remove the (bi)sulfate anions. Removal of the (bi)sulfate anion is possible by holding the cathode potential below the (bi)sulfate's point of zero charge (pzc) (Baturina et al., *Journal of the Electrochemical Society*, 156, B1423 (2009)) or by a high humidity flush (Nagahara et al., *Journal of Power Sources*, 182, 422 (2008)). Both (bi)sulfate removal methods require long treatment times (30 min to several hours) to remove the (bi)sulfate. It is currently unclear why potential cycling in air and with in situ $N_2$ are capable of removing the (bi)sulfate features and restoring complete polarization curve performance so rapidly. One possible hypothesis is that during recovery the cathode experiences air starvation, which produces water locally at the Pt active sites and lowers the cathode potential below sulfate's pzc facilitating rapid (bi)sulfate removal.

Example 12

While the most relevant definition of recovery is the complete return of the polarization curve to initial performance, an important performance metric for PEMFC recovery is the power density after recovery ($P_{recovered}$) normalized by the initial power density ($P_0$). There are two ways to evaluate the normalized power density after recovery ($P_{recovered}/P_0$): at constant voltage and at constant current density. There are advantages and disadvantages for both ways of evaluating the normalized power density after recovery. Power densities evaluated at a constant current density relate to the decrease in cell voltage (overpotential) needed to generate the required current density, while power densities evaluated at a constant voltage are more indicative of the PEMFC chemistry because it compares the PEMFC's behavior at the same relevant thermodynamic and kinetic parameters (E and T). Comparisons at constant current density do not take into account the decrease in cell efficiency accompanied by the increased overpotential. The normalized power density recovery evaluated at 0.85 V and 0.6 V is presented to evaluate recovery in the kinetic region of the polarization curve and at a practical operating point with higher current density, respectively.

Table II summarizes the five recovery methods studied in terms of recovery time and the normalized power density recovered by the method in the mass transport (0.6 V) and kinetic region (0.85 V) of the polarization curve. The driven potential cycling method with in situ $N_2$ is a suitable method for recovering the performance of $SO_2$-contaminated MEAs at 60° C. because it recovers 99% of cell performance using only PEMFC reactants, and with a recovery time under 3 min. The optimal upper scan voltage limit was determined to be 1.1 V at 60° C. This is the best compromise between sulfur oxidation and Pt site loss. The recovery time could be decreased with further optimization.

TABLE II

Effectiveness of Different Recovery Methods

| Recovery Method | Recovery Time (min) | $P_{recovered}/P_0$ at 0.6 V | $P_{recovered}/P_0$ at 0.85 V |
|---|---|---|---|
| Potential Cycling with in situ $N_2$ between 0.09 to 1.1 V | 2.4 | 0.99 | 0.92 |
| Potential Hold with in situ $N_2$ at 1.1 V | 2.7 | 0.92 | 0.73 |
| Potential Cycling in air between 0.09 to 1.1 V | 30 | 0.99 | 0.98 |
| Potential Hold in air at 1.1 V | 2.7 | 0.92 | 0.73 |
| Load Cycling in air | 4800 | 0.91 | 0.72 |
| No Recovery (after 1-ppm $SO_2$ in air for 3 h) | n/a | 0.79 | 0.71 |

Standard test conditions: 60° C., 48.3 kPag, RH of 100%|50% (anode|cathode)

Complete recovery of PEMFC polarization curve performance was independent of the atmosphere at the cathode during recovery (air vs. inert), but was strongly dependent on the potential program (cycling vs. hold). Complete recovery of the PEMFC polarization curve was only possible with a driven cell method that utilized potential cycling. Potential holds were incapable of restoring PEMFC polarization curve performance completely, likely because of the inability to desorb adsorbed (bi)sulfate anions and to regenerate a sufficient number of Pt metal sites necessary for sulfur oxidation. Load cycling was incapable of restoring PEMFC polarization curve performance completely because of the inability to access the high potentials for complete sulfur species oxidation and low potentials needed to desorb (bi) sulfate from the surface. Driven cell recovery by potential cycling with in situ $N_2$ may meet all of the criteria for operational recovery because it can access the potentials needed to oxidize adsorbed sulfur species to (bi)sulfate, desorb (bi)sulfate, and can cycle rapidly between these potentials without generating excessive ORR currents.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

Terms such as "connected," attached," "linked," and "conjugated" are used interchangeably herein and encompass direct as well as indirect connection, attachment, linkage or conjugation unless the context clearly dictates otherwise.

Where a range of values is recited, it is to be understood that each intervening integer value, and each fraction thereof, between the recited upper and lower limits of that range is also specifically disclosed, along with each subrange between such values. The upper and lower limits of any range can independently be included in or excluded from the range, and each range where either, neither or both limits are included is also encompassed. Where a value being discussed has inherent limits, those inherent limits are specifically disclosed. Where a value is explicitly recited, it is to be understood that values which are about the same quantity or amount as the recited value are also within the scope. Where a combination is disclosed, each subcombination of the elements of that combination is also specifically disclosed and is within the scope. Where any element is disclosed as having a plurality of alternatives, examples in which each alternative is excluded singly or in any combination with the other alternatives are also hereby disclosed; more than one element can have such exclusions, and all combinations of elements having such exclusions are hereby disclosed.

Unless defined otherwise or the context clearly dictates otherwise, all technical and scientific terms used herein have the same meaning as commonly understood by one of ordinary skill in the relevant art.

What is claimed is:

1. A method of improving the electrical performance of an operating fuel cell catalyst-containing cathode in a fuel cell connected to an electrical load comprising:
   stopping the flow of air to the cathode;
   operating the fuel cell with the load connected to consume oxygen at the cathode, leaving humidified nitrogen at the cathode until the fuel cell produces a current below a current threshold and a voltage less than a voltage threshold;
   disconnecting the load from the fuel cell;
   connecting a potentiostat to the fuel cell;
   cycling an applied voltage, current, or power to the fuel cell one or more times while the cathode is in contact with the humidified nitrogen;
   disconnecting the potentiostat from the fuel cell;
   reconnecting the load to the fuel cell; and
   resuming the flow of air to the cathode.

2. The method of claim 1, wherein the applied voltage ranges from a low of less than 0.1 V to a high of 1.5 V.

3. The method of claim 1, wherein the applied voltage ranges from a low of less than 0.1 V to a high of 1.1 V.

4. The method of claim 1, wherein the applied current has a current density that ranges from a low of less than −600 mA/cm² to a high of greater than +600mA/cm².

5. The method of claim 1, wherein the applied power has a power density that ranges from a low of less than −1 W/cm² to a high of greater than +1W/cm².

6. The method of claim 1, wherein the cycling is performed 1-20 times.

7. The method of claim 1, wherein the cycling is performed 1-5 times.

8. The method of claim 1, wherein the cycling is performed at 5-1500 mV/s.

9. The method of claim 1, further comprising:
applying a voltage of less than 0.1 V to the fuel cell before disconnecting the potentiostat.

10. The method of claim 1, wherein the current threshold is 5-15mA/cm2.

11. The method of claim 1, wherein the voltage threshold is 0.05-0.15V.

12. The method of claim 1, wherein the voltage threshold is 0.09 V.

\* \* \* \* \*